US012737741B2

(12) United States Patent
Thirunavukkarasu et al.

(10) Patent No.: US 12,737,741 B2
(45) Date of Patent: Sep. 15, 2026

(54) SYSTEMS AND METHODS FOR TRUSTED SELF-CHECKOUT AT RETAIL STORES

(71) Applicant: Tata Consultancy Services Limited, Mumbai (IN)

(72) Inventors: Jeisobers Thirunavukkarasu, Chennai (IN); Pookattil Jayathilakan Ranjeet, Bangalore (IN); Srjana Balraj, Chennai (IN); Srikanth Vattiam Krishnamoorthy, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 184 days.

(21) Appl. No.: 18/672,156

(22) Filed: May 23, 2024

(65) Prior Publication Data

US 2024/0428217 A1 Dec. 26, 2024

(30) Foreign Application Priority Data

Jun. 22, 2023 (IN) ............................ 202321041651

(51) Int. Cl.
*G06N 20/00* (2019.01)
*G06Q 20/18* (2012.01)
*G06Q 30/0601* (2023.01)

(52) U.S. Cl.
CPC ............ *G06Q 20/18* (2013.01); *G06N 20/00* (2019.01); *G06Q 30/0633* (2013.01)

(58) Field of Classification Search
CPC .... G06N 20/00; G06Q 30/0633; G06Q 20/20; G06Q 20/202; G06Q 20/208;
(Continued)

(56) References Cited

U.S. PATENT DOCUMENTS 10,366,443 B1 * 7/2019 Edwards .............. G06Q 20/102
10,699,537 B1 * 6/2020 Schoner ............... G06Q 20/208
(Continued)

FOREIGN PATENT DOCUMENTS

EP 4213119 A1 * 7/2023 ......... G06Q 20/3278
EP 3961501 B1 * 2/2026 ........... G06K 7/1413
WO WO-2022081518 A2 * 4/2022 ............. G06V 20/52

OTHER PUBLICATIONS

Hagendorff, T. (2021). Linking Human and Machine Behavior: A New Approach to Evaluate Training Data Quality for Beneficial Machine Learning. Minds & Machines, 31(4), 563-593. https://doi.org/10.1007/s11023-021-09573-8 (Year: 2021).*
(Continued)

*Primary Examiner* — Ashford S Hayles
(74) *Attorney, Agent, or Firm* — Finnegan, Henderson, Farabow, Garrett & Dunner, LLP

(57) ABSTRACT

Post pandemic, retailers are adopting more contactless services for shopper's checkout such as self-checkout, hybrid checkout and mobile checkout, and these touchpoints have become the potential areas for fraudulent activity during check out process. For detecting fraud carried out by a customer at the time of self-checkout, existing approaches require respective customer identity and his purchase history. Embodiments of the present disclosure do not require customer identity and information about his historical shopping carts and provide a method and system for approving a user shopping cart for self-checkout from the items picked by the customers in real time.

20 Claims, 11 Drawing Sheets

(58) Field of Classification Search
CPC ..... G06F 21/88; G06F 21/316; G07G 1/0036; G07G 1/0054; G07G 3/003
See application file for complete search history.

(56) References Cited

U.S. PATENT DOCUMENTS

| | | | | |
|---|---|---|---|---|
| 11,670,141 | B1 * | 6/2023 | Zalewski | G06Q 20/12 705/26.8 |
| 2018/0240180 | A1 * | 8/2018 | Glaser | G07G 1/0081 |
| 2018/0373928 | A1 * | 12/2018 | Glaser | G06V 40/20 |
| 2020/0005310 | A1 * | 1/2020 | Kumar | G06F 18/23213 |
| 2020/0184444 | A1 * | 6/2020 | Gu | G07G 1/0036 |
| 2020/0273013 | A1 * | 8/2020 | Garner | G06F 16/535 |
| 2021/0287013 | A1 * | 9/2021 | Carter | G06N 3/0464 |
| 2022/0114868 | A1 * | 4/2022 | Bronicki | G06Q 30/06 |
| 2022/0198550 | A1 * | 6/2022 | Meidar | G06Q 20/20 |
| 2022/0270099 | A1 | 8/2022 | Naito et al. | |
| 2022/0374970 | A1 * | 11/2022 | Bronicki | G06Q 30/0241 |
| 2023/0123576 | A1 * | 4/2023 | Gu | G06Q 20/38215 705/74 |
| 2026/0024101 | A1 * | 1/2026 | Kramme | G06Q 30/0185 |

OTHER PUBLICATIONS

Vitynskyi et al., "Ensemble-based Method of Fraud Detection at Self-checkouts in Retail," (2019).

* cited by examiner

monitoring correctly categorized, the first type or the second type of one or more shopping carts through one or more monitoring devices and storing information comprising at least one context and a format of a plurality of correctly categorized shopping carts — 216 continually improving an accuracy of the categorization, in the earlier phase of the self-checkout development, through (i) a self-learning mechanism by using the at least one context, the format, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts, and (c) real time specific ideal formats of associated real time factors in an iterative manner — 218 developing and training a machine learning model in an advanced phase of self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts — 220 approving in the real-time, the user shopping cart for a check out predicted as the first type by the trained machine learning model based on a comparison of the predicted probability of the user shopping cart with dynamic cut off value of the predicted probability by the trained machine learning model — 222

FIG. 3B

monitoring outcome, for the first type and the second type through the one or more monitoring devices and storing information pertaining to the at least one context, the format of the plurality of correctly approved user shopping carts and associated predicted probabilities

224 continually improving the accuracy of the approval of the user shopping carts, in the advanced phase of self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts and (c) real time specific ideal formats of associated real time factors in an iterative manner

226

FIG. 3C $$d(p,q) = \sqrt{(p_1 - q_1)^2 + (p_2 - q_2)^2 + \ldots + (p_n - q_n)^2}$$

| Timestamp | Day of the week | Weekend/ Weekday | Stage of the month | Winter/ Summer | | Part of the day |
|---|---|---|---|---|---|---|
| 2/4/23 8:23 AM | Saturday | Weekend | First weekend of the month | Winter weekend | | Moming |
| 2/6/23 6:23 PM | Monday | Weekday | First weekdays of the month | Winter weekdays | | Evening |
| | | | | | | |
| 2/14/23 1:23 PM | Tuesday | Weekday | Third weekdays of the month | Winter weekdays | | Noon |
| | | | | | | |
| | | | | | | |
| 12/20/22 5:15 PM | | | | | | |

FIG. 7

Format 1

| | Item_1 | Item_2 | Item_3 | Item_4 | Item_5 | Item_6 | ... | ... | Item_98 | Item_99 | Item_100 |
|---|---|---|---|---|---|---|---|---|---|---|---|
| Basket_1 | 10 | 0 | 0 | 3 | 1 | 0 | ... | ... | 5 | 9 | 0 |
| Basket_2 | 4 | 0 | 0 | 5 | 3 | 0 | ... | ... | 1 | 6 | 0 |
| Basket_ | | | | | | | | | | | |
| Basket_ | 3 | 0 | 0 | 6 | 9 | 0 | ... | ... | 1 | 7 | 0 |

Format 2

| | Class_1 | Class_2 | Class_3 | Class_4 | Class_5 | Class_6 | ... | ... | Class_18 | Class_19 | Class_20 |
|---|---|---|---|---|---|---|---|---|---|---|---|
| Basket_1 | 2.2 | 0 | 4.1 | 1.9 | 0 | 0 | ... | ... | 0 | 5.7 | 0 |
| Basket_2 | 0.9 | 0 | 0 | 4.3 | 0.9 | 0 | ... | ... | 0.4 | 2.4 | 0 |
| Basket_ | | | | | | | | | | | |
| Basket_ | 1.9 | 0 | 0 | 2.6 | 1.9 | 0 | ... | ... | 2.6 | 1.1 | 0 |

Format 3

| | Category_1 | Category_2 | Category_3 | ... | ... | Category_8 |
|---|---|---|---|---|---|---|
| Basket_1 | 5.1 | 0 | 9.5 | ... | ... | 0 |
| Basket_2 | 3.2 | 0 | 0 | ... | ... | 2.8 |
| Basket_ | | | | | | |
| Basket_ | 6.4 | 0 | 0 | ... | ... | 6.1 |

Format 1

| | Item_1 | Item_2 | Item_3 | Item_4 | Item_5 | Item_6 | ... | Item_98 | Item_99 | Item_100 |
|---|---|---|---|---|---|---|---|---|---|---|
| Basket_1 | 0.6 | 0 | 0 | 3.1 | 2.2 | 0 | ... | 0.7 | 1.3 | 0 |
| Basket_2 | 0.4 | 0 | 0 | 1.7 | 0.9 | 0 | ... | 0.4 | 0.8 | 0 |
| Basket_ | | | | | | | | | | |
| Basket_ | 0.7 | 0 | 0 | 2.6 | 1.9 | 0 | ... | 0.6 | 1.1 | 0 |

Format 2

| | Class_1 | Class_2 | Class_3 | Class_4 | Class_5 | Class_6 | ... | Class_18 | Class_19 | Class_20 |
|---|---|---|---|---|---|---|---|---|---|---|
| Basket_1 | 2.2 | 0 | 4.1 | 1.9 | 0 | 0 | ... | 0 | 5.7 | 0 |
| Basket_2 | 0.9 | 0 | 0 | 4.3 | 0.9 | 0 | ... | 0.4 | 2.4 | 0 |
| Basket_ | | | | | | | | | | |
| Basket_ | 1.9 | 0 | 0 | 2.6 | 1.9 | 0 | ... | 2.6 | 1.1 | 0 |

Format 3

| | Category_1 | Category_2 | Category_3 | ... | Category_8 |
|---|---|---|---|---|---|
| Basket_1 | 5.1 | 0 | 9.5 | ... | 0 |
| Basket_2 | 3.2 | 0 | 0 | ... | 2.8 |
| Basket_ | | | | | |
| Basket_ | 6.4 | 0 | 0 | ... | 6.1 |

SYSTEMS AND METHODS FOR TRUSTED SELF-CHECKOUT AT RETAIL STORES

PRIORITY CLAIM

This U.S. patent application claims priority under 35 U.S.C. § 119 to: Indian patent application Ser. No. 20/2321041651, filed on Jun. 22, 2023. The entire contents of the aforementioned application are incorporated herein by reference.

TECHNICAL FIELD

The disclosure herein generally relates to enhanced self-checkout techniques, and, more particularly, to systems and methods for trusted self-checkout at retail stores with increased trust by preempting fraudulent activity of a customer from the items picked by the customer.

BACKGROUND

Shrinkage is the loss of inventory that can be attributed to factors such as employee theft, shoplifting, administrative error, vendor fraud, damage, and cashier error. Shrinkage is an $100B problem for retailers. One of the major factors contributing to shrinkage is theft/shoplifting. Approximately 40% of retail shrinkage is attributed to external theft and another 30% due to internal theft. Retailers have been implementing additional control measures through investment in various in-store technologies such as security camera, alert sensors, Radio Frequency identifier (RFID) tags, etc. Many artificial intelligences (AI)/machine learning (ML) based Point of Sale systems have also been piloted to detect price swapping and malpractices during item scanning. According to the National Retail Federation's 2022 Retail Security Survey, shoplifting/theft still continues to be an $100B problem for retailers.

Post pandemic, retailers are adopting more contactless services such as self-checkout, hybrid checkout and mobile checkout. With the increase in self-checkout kiosks at store, these touchpoints have become the potential areas for fraudulent activity. Although the AI based solutions that are currently available in the retail industry are extendable for self-checkout, these solutions require customer identification and they come into play at the tail end of customer journey.

Current AI/ML based approaches are either computer vision-based algorithms for detecting fraud at the time of checkout, or usage of data science to predict the fraudulence, based on customer's purchase history, at the time of checkout. However, these approaches have dependency on customer identity and customer's historical behavior which is derived from his historical shopping carts.

SUMMARY

Embodiments of the present disclosure present technological improvements as solutions to one or more of the above-mentioned technical problems recognized by the inventors in conventional systems.

For example, in one aspect, there is provided a processor implemented method for trusted self-checkout at retail stores by preempting fraudulent activity of a customer from the items picked by the customer. The method comprises obtaining in real-time, via one or more hardware processors, information pertaining to a user shopping cart associated with a user for a context comprising one or more real-time factors, wherein the user shopping cart comprises one or more items being added therein; extracting in the real-time, via the one or more hardware processors, a plurality of historical universal shopping carts containing the one or more items being added in the user shopping cart and which is done in a similar context of the user shopping cart; measuring in the real-time, via the one or more hardware processors, similarity of the plurality of historical universal shopping carts based on one or more formats of the plurality of historical universal shopping carts; determining in the real-time via the one or more hardware processors, during addition of the one or more items in the shopping cart, an improvement in similarity among the extracted historical universal shopping carts containing the one or more items being added in the user shopping cart for the context; identifying in the real-time, via the one or more hardware processors, a first set of items amongst the one or more items being added in the user shopping cart based on the improvement in similarity; determining in the real-time, via the one or more hardware processors, a context specific expected distribution for the user shopping cart based on a distance distribution of the plurality of historical universal shopping carts containing the first set of items pertaining to the context; and categorizing in the real-time via the one or more hardware processors, in an earlier phase of a self-checkout development, the user shopping cart as a first type or a second type based on a position of the user shopping cart in comparison to dynamic cut off value of the context specific expected distribution for an approval of the user shopper cart; monitoring correctly categorized via the one or more hardware processors, the first type or the second type of one or more shopping carts through one or more monitoring devices and storing information comprising at least one context and a format of a plurality of correctly categorized shopping carts; continually improving an accuracy of the categorization via the one or more hardware processors, in the earlier phase of the self-checkout development, through (i) a self-learning mechanism by using the at least one context, the format, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts and (c) real time specific ideal formats of associated real time factors in an iterative manner; developing and training, via the one or more hardware processors, a machine learning model in an advanced phase of the self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts; approving in the real-time via the one or more hardware processors, the user shopping cart for a check out predicted as the first type by the trained machine learning model based on a comparison of the predicted probability of the user shopping cart with dynamic cut off value of the predicted probability by the trained machine learning model; monitoring outcome via the one or more hardware processors, for the first type and the second type through the one or more monitoring devices and storing information pertaining to the at least one context, the format of the plurality of correctly approved user shopping carts and associated predicted probabilities; and continually improving the accuracy of the approval of the user shopping carts via the one or more hardware processors, in the advanced phase of the self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts and (c) real time specific ideal formats of associated real time factors in an iterative manner.

In another aspect, there is provided a processor implemented system for trusted self-checkout at retail stores by preempting fraudulent activity of a customer from the items picked by the customer. The system comprises: a memory storing instructions; one or more communication interfaces; and one or more hardware processors coupled to the memory via the one or more communication interfaces, wherein the one or more hardware processors are configured by the instructions to: obtain in real-time, information pertaining to a user shopping cart associated with a user for a context comprising one or more real-time factors, wherein the user shopping cart comprises one or more items being added therein; extract in the real-time, a plurality of historical universal shopping carts containing the one or more items being added in the user shopping cart and which is done in a similar context of the user shopping cart; measure in the real-time, similarity of the plurality of historical universal shopping carts based on one or more formats of the plurality of historical universal shopping carts; determine in the real-time, during addition of the one or more items in the shopping cart, an improvement in similarity among the extracted historical universal shopping carts containing the one or more items being added in the user shopping cart for the context; identify in the real-time, a first set of items amongst the one or more items being added in the user shopping cart based on the improvement in similarity; determine in the real-time, a context specific expected distribution for the user shopping cart based on a distance distribution of the plurality of historical universal shopping carts containing the first set of items pertaining to the context; and categorize in the real-time, in an earlier phase of the self-checkout development, the user shopping cart as a first type or a second type based on a position of the user shopping cart in comparison to dynamic cut off value of the context specific expected distribution for an approval of the user shopper cart; monitor correctly categorized, the first type or the second type of one or more shopping carts through one or more monitoring devices and storing information comprising at least one context and a format of a plurality of correctly categorized shopping carts; continually improve an accuracy of the categorization, in the earlier phase of the self-checkout development, through (i) a self-learning mechanism by using the at least one context, the format, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts and (c) real time specific ideal formats of associated real time factors in an iterative manner; develop and train, a machine learning model in an advanced phase of the self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts; approving in the real-time, the user shopping cart for a check out predicted as the first type by the trained machine learning model based on a comparison of the predicted probability of the user shopping cart with dynamic cut off value of the predicted probability by the trained machine learning model; monitoring outcome, for the first type and the second type through the one or more monitoring devices and storing information pertaining to the at least one context, the format of the plurality of correctly approved user shopping carts and associated predicted probabilities; and continually improving the accuracy of the approval of the user shopping carts, in the advanced phase of the self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts and (c) real time specific ideal formats of associated real time factors in an iterative manner.

In yet another aspect, there are provided one or more non-transitory machine-readable information storage mediums comprising one or more instructions which when executed by one or more hardware processors cause trusted self-checkout at retail stores through preempting fraudulent activity of a customer from the items picked by the customer by obtaining in real-time, information pertaining to a user shopping cart associated with a user for a context comprising one or more real-time factors, wherein the user shopping cart comprises one or more items being added therein; extracting in the real-time, a plurality of historical universal shopping carts containing the one or more items being added in the user shopping cart and which is done in a similar context of the user shopping cart; measuring in the real-time, similarity of the plurality of historical universal shopping carts based on one or more formats of the plurality of historical universal shopping carts; determining in the real-time, during addition of the one or more items in the shopping cart, an improvement in similarity among the extracted historical universal shopping carts containing the one or more items being added in the user shopping cart for the context; identifying in the real-time, a first set of items amongst the one or more items being added in the user shopping cart based on the improvement in similarity; determining in the real-time, a context specific expected distribution for the user shopping cart based on a distance distribution of the plurality of historical universal shopping carts containing the first set of items pertaining to the context; and categorizing in the real-time, in an earlier phase of a self-checkout development, the user shopping cart as a first type or a second type based on a position of the user shopping cart in comparison to dynamic cut off value of the context specific expected distribution for an approval of the user shopper cart; monitoring correctly categorized, the first type or the second type of one or more shopping carts through one or more monitoring devices and storing information comprising at least one context and a format of a plurality of correctly categorized shopping carts; continually improving an accuracy of the categorization, in the earlier phase of the self-checkout development, through (i) a self-learning mechanism by using the at least one context, the format, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts and (c) real time specific ideal formats of associated real time factors in an iterative manner; developing and training, a machine learning model in an advanced phase of the self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts; approving in the real-time, the user shopping cart for a check out predicted as the first type by the trained machine learning model based on a comparison of the predicted probability of the user shopping cart with dynamic cut off value of the predicted probability by the trained machine learning model; monitoring outcome, for the first type and the second type through the one or more monitoring devices and storing information pertaining to the at least one context, the format of the plurality of correctly approved user shopping carts and associated predicted probabilities; and continually improving the accuracy of the approval of the user shopping carts, in the advanced phase of the self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts and (c) real time specific ideal formats of associated real time factors in an iterative manner.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A through 3C (collectively referred to as FIG. 3) depicts an exemplary flow chart illustrating a method for preempting fraudulent and authenticating users during self-checkout at retail stores, using the system of FIG. 1, in accordance with an embodiment of the present disclosure.

FIG. 7 illustrates real-time factors of a context associated with the user shopping cart, in accordance with an embodiment of the present disclosure.

DETAILED DESCRIPTION

Figure 1:
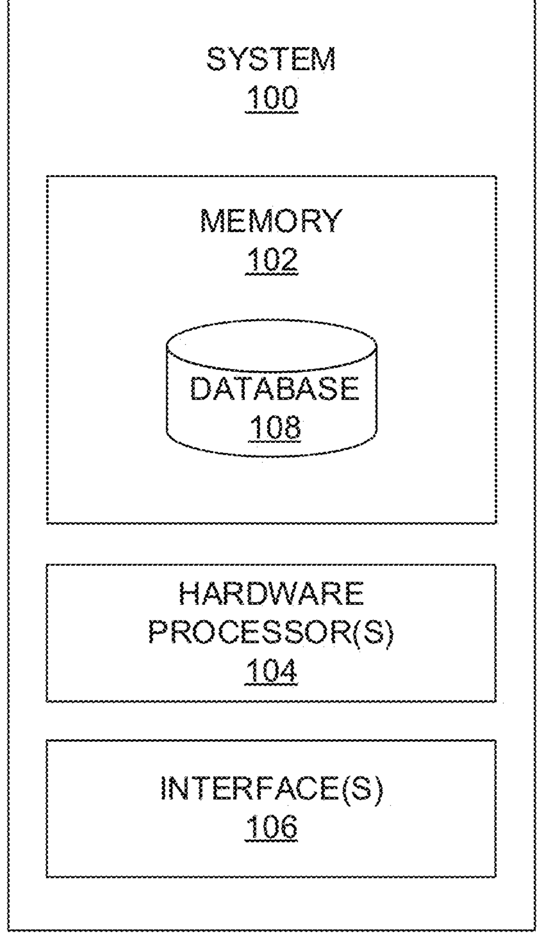
FIG. 1 depicts an exemplary system for preempting fraudulent and authenticating users during self-checkout at retail stores, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIGS. 1 through 10, where similar reference characters denote corresponding features consistently throughout the figures, there are shown preferred embodiments and these embodiments are described in the context of the following exemplary system and/or method.

FIG. 1 depicts an exemplary system for preempting fraudulent and authenticating users during self-checkout at retail stores, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information pertaining to (i) a user shopping cart associated with a user for a context comprising one or more real-time factors, (ii) a plurality of historical universal shopping carts containing the one or more items being added in the user shopping cart and which is done in a similar context of the user shopping cart; similarity of the plurality of historical universal shopping carts based on one or more formats of the plurality of historical universal shopping carts; context specific expected distribution for the user shopping cart; users being categorized as a first type or a second type. The database further comprises dynamic cut off value of the context specific expected distribution for an approval of the user shopper cart. The memory further comprises one or more machine learning (ML) model or artificial intelligence (AI) technique(s) as known in the art, and the like, which when executed enable the system 100 to perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
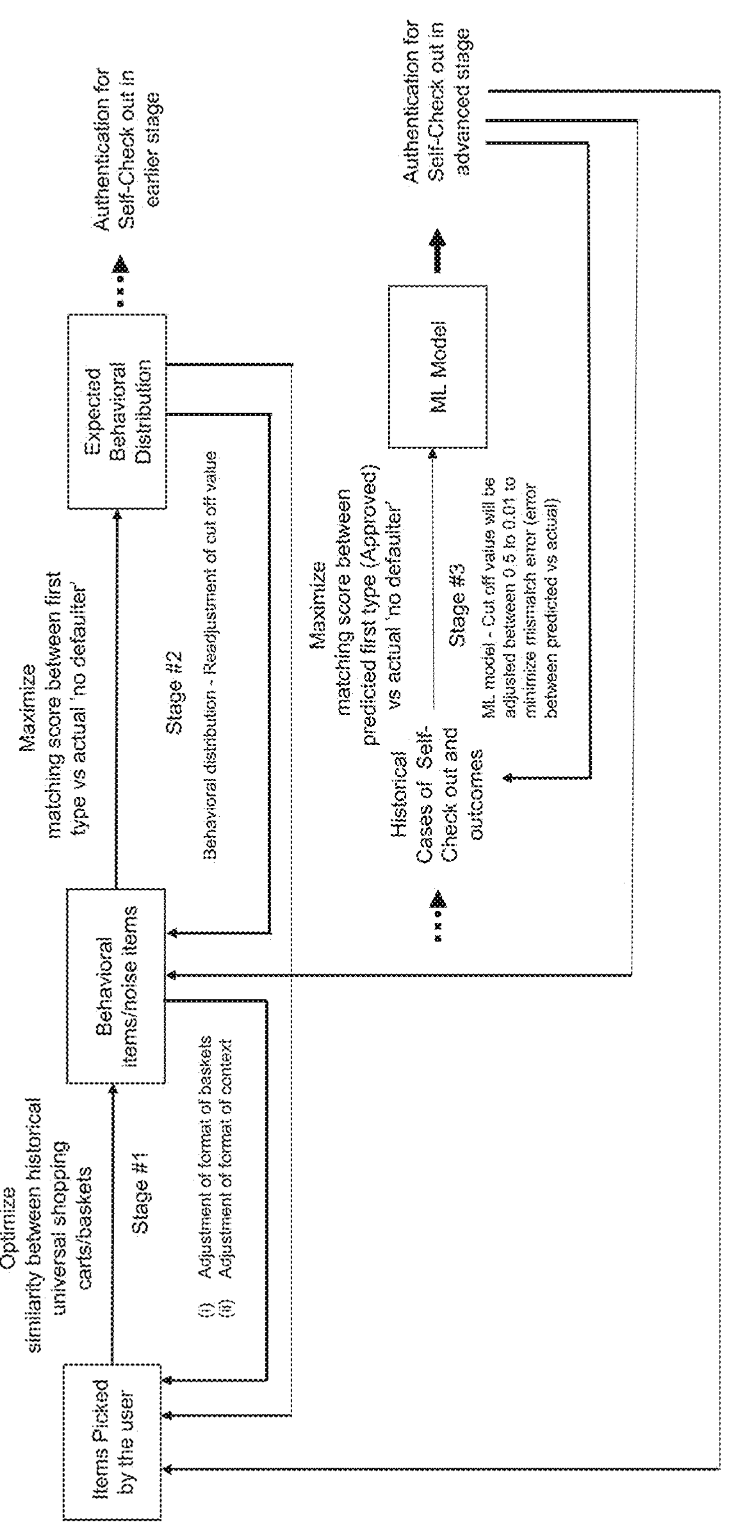
FIG. 2 depicts an exemplary high level block diagram of the system 100 illustrating various self-learning stages for preempting fraudulent and authenticating users during self-checkout at retail stores, in accordance with an embodiment of the present disclosure.

FIG. 2, with reference to FIG. 1, depicts an exemplary high level block diagram of the system 100 illustrating various self-learning stages for preempting fraudulent and authenticating users during self-checkout at retail stores, in accordance with an embodiment of the present disclosure.

Figure 3A:

FIG. 3, with reference to FIGS. 1-2, depicts an exemplary flow chart illustrating a method for preempting fraudulent and authenticating users during self-checkout at retail stores, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3.

At step 202 of the method of the present disclosure, the one or more hardware processors 104 are configured to obtain in real-time, information pertaining to a user shopping cart associated with a user for a context comprising one or more real-time factors. The user shopping cart comprises one or more items being added therein. In the present disclosure, the expressions user(s), customer(s) and/or shopper(s) refer to same entity and are used interchangeably herein. When a shopper/user picks an item in a brick-and-mortar store (e.g., say a retail store, and the like) at a particular point of time, the item being shopped can be identified through numerous ways. State of the art techniques such as image processing at the time of instore shopping, internet of things (IOT) sensor-based planograms as well as smart shopping carts, reading RFID tags, item scan at the time of checkout, portable barcode scanner applied by the customer to scan and bag items while shopping etc., may be used by the system 100. Other real time factors associated with the item such as the time when shopped, the store demographics, weather condition, etc. are used to derive the context. The context may take original value of the real time factor or derived value of real time factor and they are commonly termed as different forms of context. For instance, if the item is picked by the shopper 'Maya' at 8 AM on 1 Apr. 2023, it is enriched with additional derived information and stored in the system 100 as additional parameters. In the above example, the derived variables for an item shopped at '8 AM on 1 Apr. 2023' would be the day of the week (Saturday), day being a weekend, day being the first weekend as well as the first Saturday of the month, time being the morning hours and the like and the context is noted as different form of time factor. By same way, the other factors such as weather conditions, location of the store are also converted by considering their effect on buying behavior of shoppers. Refer FIG. 7 for additional examples for derived variables. More specifically, FIG. 7, with reference to FIGS. 1 through 6C, illustrates real-time factors of a context associated with the user shopping cart, in accordance with an embodiment of the present disclosure. Creation of derived variables enables the system 100 to determine the expected intention of the shopper as closest as possible though series of steps (described in further detail in subsequent paragraphs).

Referring to steps of FIG. 3, once the information pertaining to the user shopping care is obtained, at step 204 of the method of the present disclosure, the one or more hardware processors 104 are configured by the instructions to extract in the real-time, a plurality of historical universal shopping carts containing the one or more items being added in the user shopping cart and which is done in a similar context of the user shopping cart. The above step 204 is better understood by way of following description:

One or more historical universal shopping carts containing the one or more items being added in the user shopping cart are extracted in the real time. The one or more historical universal shopping carts are extracted in similar scenario of the user shopping cart by applying one or more similar real-time factors associated with the user shopping cart. Historical shopping carts having the same item with the same context are filtered. For the said example, all the historical shopping carts consisting of the item, for a predefined/configured period (e.g., say for last one year), with the matching contextual condition, such as first Saturday morning of the month and matching weather conditions are (temperature range of 77 F.) and the like are filtered. Here the historical shopping carts of all the shoppers termed as general shoppers are considered, irrespective of the shopper who picks the item/product. The historical shopping carts are noted as universal shopping carts. The terms 'user shopping cart' and 'universal shopping cart' are used to denote the shopping cart of user and general user respectively. Here, shopper/user denotes the user who is picking the item in real time and whose shopping cart is going to be validated for authentication/approval for self-checkout. User shopping cart and test shopping cart are used interchangeably. General shopper/general user denotes the user who has universal historical shopping carts in the past which is stored in the system. This enables the system 100 to determine the intent of the shopper/user with respect to a context. In other words, the intent of the shopper/user is derived through use of universal historical shopper carts of general shoppers. Thus, the method of the present disclosure suits well for a new shopper/user who is visiting the store for the first time and also for the shopper/user whose identification is not available in the database 108.

At step 206 of the method of the present disclosure, the one or more hardware processors 104 measure in the real-time, similarity of the plurality of historical universal shopping carts based on one or more formats of the plurality of historical universal shopping carts. The above step 206 is better understood by way of following description:

Similarity of the historical universal shopping carts is measured in the real time by considering different format such as different format of items present in the historical universal shopping carts, different format of value spread of the historical universal shopping carts, different format of order of picking of items of the historical universal shopping carts and the like and which is done simultaneously and at varying level of importance (e.g., an associated importance level) for different format.

Figure 4:
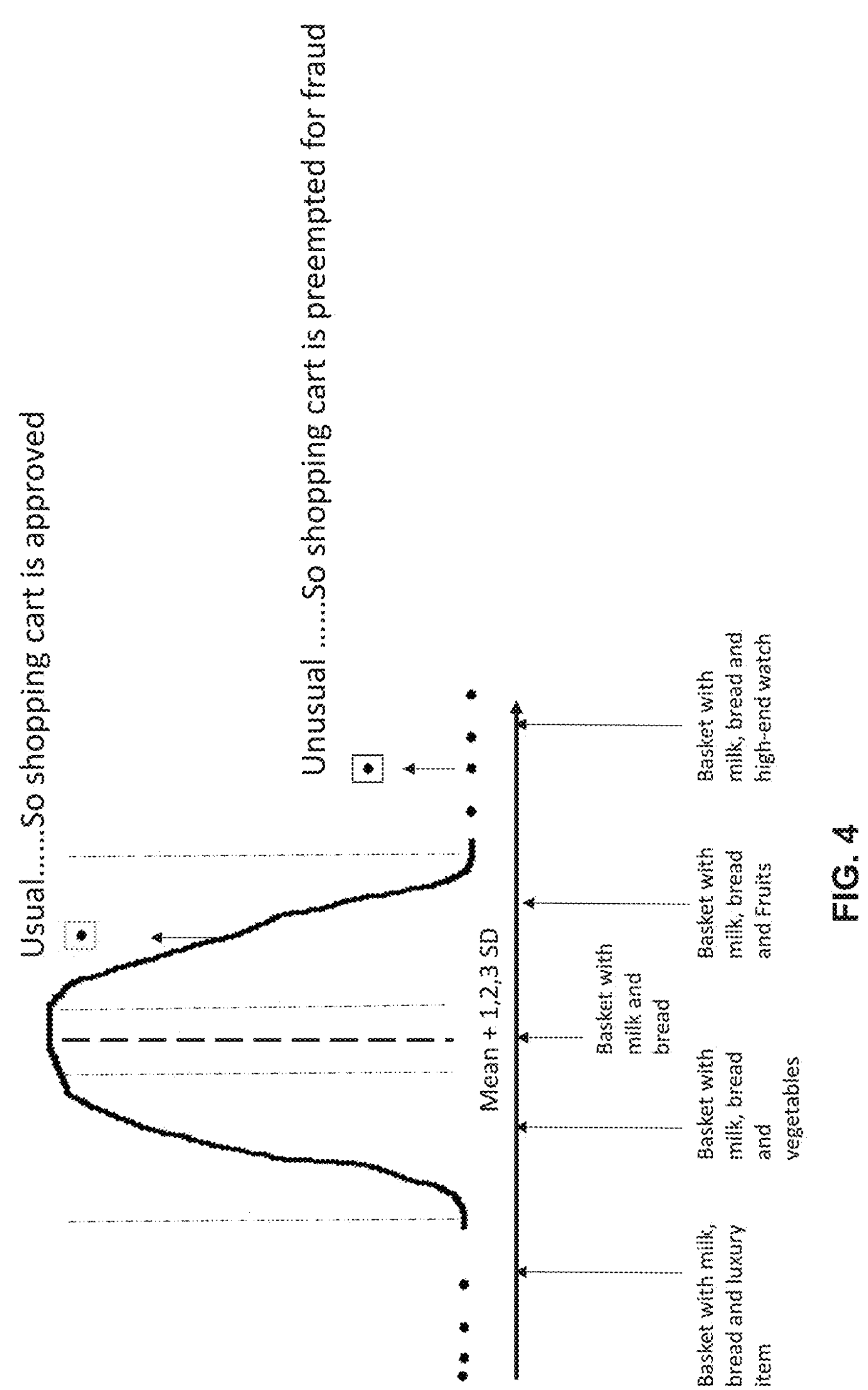
FIG. 4 depicts a context specific expected distribution for the user shopping cart based on a distance distribution of the plurality of historical universal shopping carts containing the first set of items pertaining to the context, in accordance with an embodiment of the present disclosure.
Figure 5:
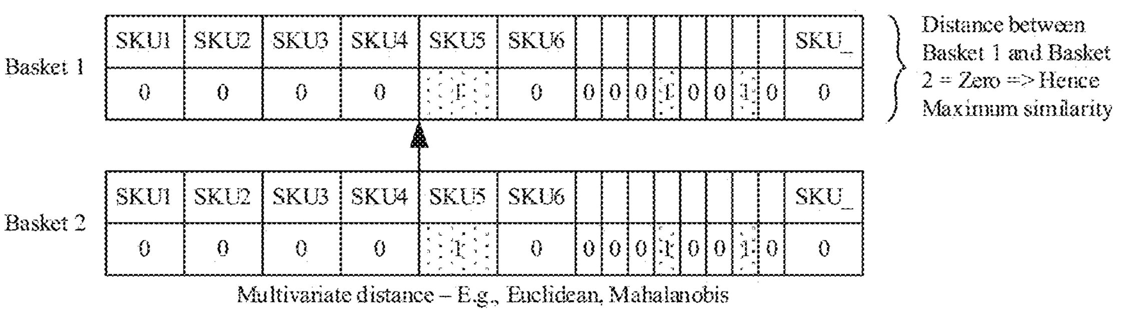
FIG. 5 illustrates computation of Euclidean distance between shopping cart 1 and shopping cart 2 (e.g., also referred to as basket 1 and basket 2), in accordance with an embodiment of the present disclosure.
Figure 8:
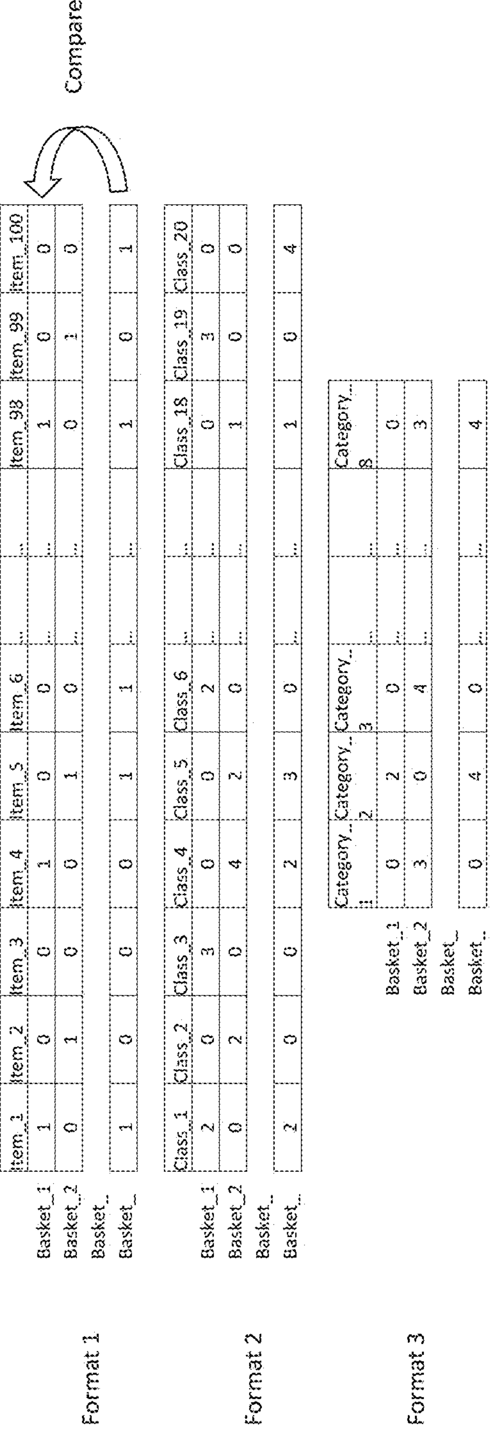
FIG. 8 depicts a format of one or more shopping carts for a first scenario (e.g., Stock Keeping Unit (SKU), class, category spread, and the like), in accordance with an embodiment of the present disclosure.
Figure 9:
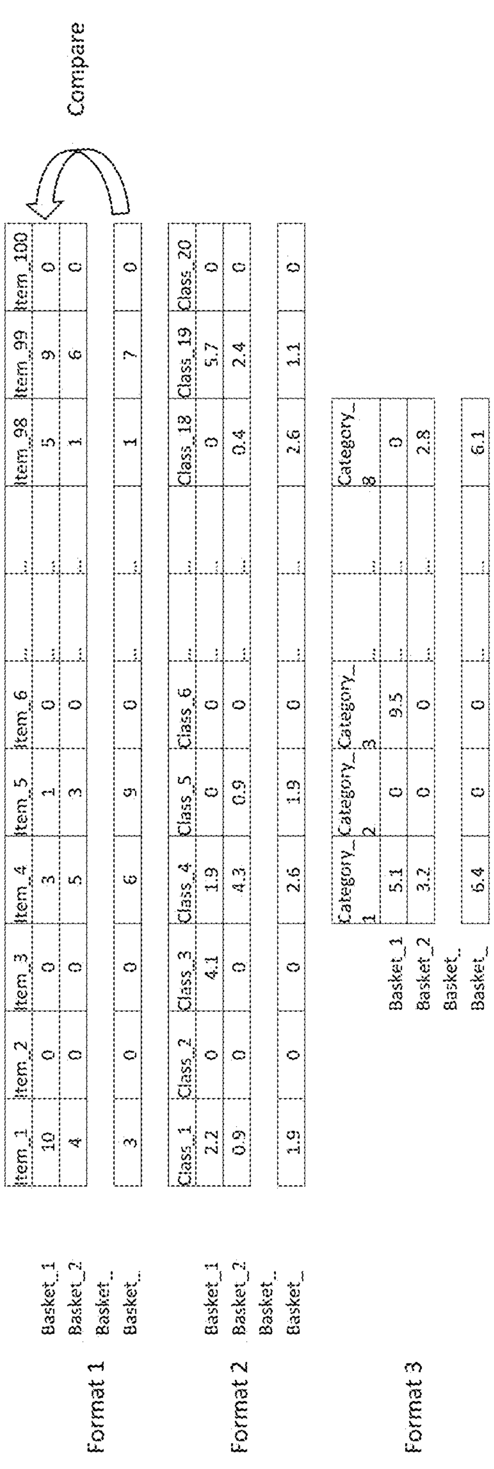
FIG. 9 depicts a format of the one or more shopping carts for a second scenario (e.g., order of picking), in accordance with an embodiment of the present disclosure.
Figure 10:
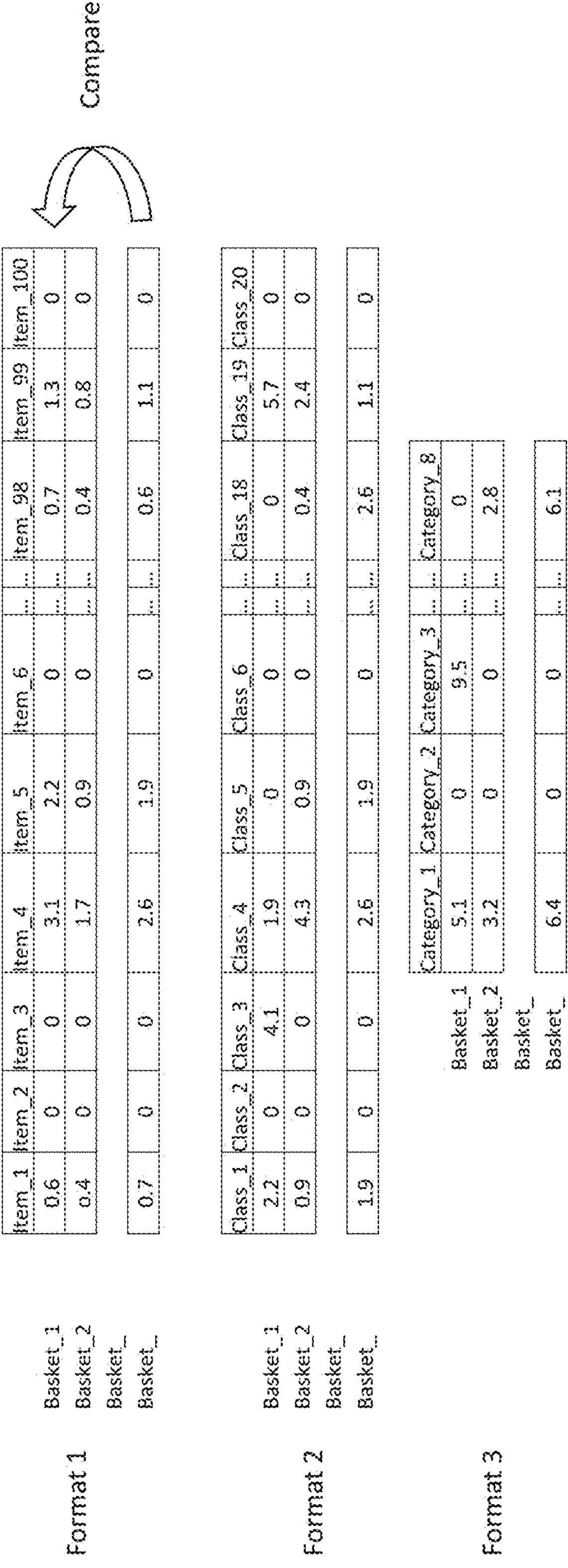
FIG. 10 depicts a format of the one or more shopping carts for a third scenario (e.g., value spread), in accordance with an embodiment of the present disclosure.

Filtered shopping carts are considered as a group and similarity of the filtered historical shopping carts are measured by using a measure termed as 'within group sum of squares'. If the within group sum of square is low, it indicates higher similarity among the shopping carts or higher homogeneity within the group and vice versa. The process of calculating "within group sum of square" is similar to the process of finding "within cluster sum of square", which is the standard procedure in clustering (as known in the art technique). Here the group is considered as a cluster and for finding within group sum of square, Euclidean distance between a given shopping cart and centroid of the filtered shopping carts is calculated. This process is repeated for all shopping carts, and the distance values are summed for the group and divided by the number of shopping carts which provides within group sum of square. FIG. 5, with reference to FIG. 4, illustrates computation of Euclidean distance between shopping cart 1 and shopping cart 2 (e.g., also referred to as basket 1 and basket 2), in accordance with an embodiment of the present disclosure. While finding the distance, the format of the shopping cart takes many formats as explained in the FIGS. 8 through 10. FIGS. 8 through 10, with reference to FIGS. 1 through 7, depict various formats of one or more shopping carts, in accordance with an embodiment of the present disclosure. FIG. 8, with reference to FIGS. 1 through 7, depicts a format of one or more shopping carts for a first scenario (e.g., Stock Keeping Unit (SKU) spread, class spread, category spread, and the like), in accordance with an embodiment of the present disclosure. FIG. 9, with reference to FIGS. 1 through 8, depicts a format of the one or more shopping carts for a second scenario (e.g., order of picking), in accordance with an embodiment of the present disclosure. FIG. 10, with reference to FIGS. 1 through 9, depicts a format of the one or more shopping carts for a third scenario (e.g., value spread), in accordance with an embodiment of the present disclosure. This enables the system 100 to determine the expected intention of the shopper/user as closer as possible though series of steps with varying weights for different format and varying weights for different items.

The similarity of shopping carts depends on the format of context in addition to format of shopping carts. Consider the above example of Maya who picks the items on 1 Apr. 2023, the historical universal shopping carts of $1^{st}$ of every month is filtered and similarity among the historical universal shopping carts is found. In second trial, the historical shopping carts of first Saturday of every month is filtered as 1 Apr. 2023 is a Saturday. It is expected that second trial may have more similarity than first trial and thus the output from second trial is preferrable than first trial, to derive expected shopper/user's intent. Similarly, several trials may be tried to create derived variable shown in FIG. 7. This further improves the similarity of historical shopping carts. Thus, the format of context also plays a key role in improving the similarity of shopping carts.

Referring to steps of FIG. 3, once the information pertaining to the user shopping care is obtained, at step 208 of the method of the present disclosure, the one or more hardware processors 104 are configured by the instructions to determine, during addition of the one or more items in the shopping cart, an improvement in similarity among the extracted historical universal shopping carts containing the one or more items being added in the user shopping cart for the context. At step 210 of the method of the present disclosure, the one or more hardware processors 104 are configured by the instructions to identify in the real-time, a first set of items amongst the one or more items being added in the user shopping cart based on the improvement in similarity. The steps 208 and 210 are better understood by way of following description:

When a new item is added in the shopping cart by the shopper/user, previous steps are repeated by considering that the historical shopping carts have both the items. Based on the new item added, variations within the group of historical shopping carts may decrease or increase. Within group variation will have opposite relationship with homogeneity or similarity of the group. When the within group variation is reduced then the new item is noted as behavioral item and the level of reduction is noted as signal carried by the item in positive direction towards identifying intention of the user. When the within group variation is increased then the item is noted as noise item and the level of increase is noted as signal carried by the item in negative direction. Behavioral items are noted as first set of items and noise items are noted as second set of items. Identification of behavioral item and noise item is repeated as and when a new item is added in the shopping cart, by considering that the historical shopping carts should have previous items. Below description provides real life examples to explain the logic of similarity and similarity improvement to locate the behavioral attribute and noise attribute.

An image with face of a famous/well known person belonging to an ethnic group is considered for explanation purpose. In a first instance, part of the image particularly only eye of the image is selected and searched for suitable face matching the selected eye. Images suggested by a search engine is made into a group and termed as a first instance group. In the second instance, part of the image particularly nose of the image is selected and searched for suitable face matching the selected nose. The images suggested by the search engine are grouped and termed as second instance group. In the third instance, both nose of the image and eye of the image are considered for searching a suitable matching face. The images suggested by the search engine is grouped and termed as third instance group. In a fourth instance, part of the image particularly skin color of the image is selected in addition to the eye selected in the first instance. This combination is used for searching suitable face that matches with both selected eye and the skin color. The images suggested by the search engine is made into a group and termed as fourth instance group. Similarity among the images of first instant group is calculated using standard methodologies followed in the art. This is repeated for all the 4 groups. It is expected that the third instance group may have the highest similarity. This is due to the fact that eye and nose are the distinct attributes that improve homogeneity across images of third group. While the fourth group may have lesser similarity as compared to third group due to the reason that, skin color may not be a useful attribute as compared to nose in deciding the face and it may act as a noise and may decrease the similarity of images for the fourth instance group. The other attributes similar to skin color which could act as noise are eye glass, width of face, and length of face, etc. In summary, usefulness of an attribute in deciding the face may be in proportion to its contribution towards homogeneity among the images suggested by search engine. It is to be noted that the attributes are considered as an indicative of the logic. It is to be understood by a person having ordinary skill in the art or person skilled in the art that such examples of attributes shall not be construed as limiting the scope of the present disclosure.

Finding of similarity between shopping carts of a group is explained using two shopping carts as the basic step for understanding purpose. Two shopping carts are said to be similar or dissimilar based on the items present in those shopping carts, their value, order of picking, and the like. It is challenging to compare two shopping carts for finding similarity between them due to the nature of products owned by the shopping carts. (1) Some items may act better for finding similarity if they are captured at Stock Keeping Unit (SKU) level, and some items may act better if they are captured at sub class level or class level, and the like. In an instance, milk with two brands is noted as two SKUs or two different items. Ideally the two SKUs need to be considered as same item for finding similarity of shopping carts having the two SKUs in separate shopping cart. Thus, the two items should not be considered at SKU level as milk with two brands are considered as two different items at SKU level. These need to be considered at higher level, in an instance at sub class level i.e., milk without brand differentiation which is one level higher in the hierarchy. On the contrary, if the two SKUs are considered as dairy which is the department level, the highest version in the hierarchy, it will be too generic and may mislead for finding similarity. Here, ice cream and yogurt assuming their presence in the shopping cart, are considered as dairy and cannot be differentiated with milk as all the three items are considered as dairy. Two stage weighing overcomes the variability in nature of items for comparing two or more shopping carts by giving unequal weights for items and also unequal weights for different format such as item spread, value spread, order of picking, etc. Two stage weighing enables the system 100 to capture expected customer intention as much as possible from the shopping carts bought by them by finding ideal weights for each item and by looking each shopping cart in suitable weighted format in which the suitable weighted format is decided by the system 100 through repeated iterations in real time as well as in different batches by mapping the final success of the self-checkout. Thus, the expected customer intent that leads to a first type or second type is captured through suitable formats and two types of weighing.

First type weight: The method of finding the Euclidean distance between two universal shopping carts is displayed in FIG. 5. While finding the distance, the format of the shopping cart takes many formats as displayed in FIGS. 7 through 9. For each format, Euclidean distance between two shopping carts is calculated. Weighted average is used to find weighted Euclidean distance in such a way that the average of weights is equal to one and here, some format of the shopping cart may be assigned the value of greater than 1 and some format may be assigned the value of lesser than 1 with the condition that the average of weights is equal to one and the value assigned to each format is in proportion to their contribution in deciding the similarity between two shopping carts. This enables to identify suitable weights which produces as lower weighted Euclidean distance as possible in resulting optimal similarity among the universal shopping carts which is arrived in an iterative manner.

Second type weight-Euclidean distance is calculated using the equation depicted in (FIG. 5). When each pair such as (p1 and q1), (p2 and q2), etc., is given the numeric value '1' as weight, it is noted as equal weight. Initially it is assumed that all pairs are assigned equal weights, and no specific weights are added in the equation. If the pairs are assigned values such as 0.8, 0.9, 1.1, 1.2, etc. it is noted as unequal weight and these weights are applied for each pair and magnitude of weight for each pair is decided by the system 100 by ensuring the sum of weights is equal to 'n', to result optimal similarity among the universal shopping carts in an iterative manner and here 'n' is the number of items displayed for the sale.

Referring to steps of FIG. 3, at step 212 of the method of the present disclosure, the one or more hardware processors 104 are configured by the instructions to determine in the real-time, a context specific expected distribution for the user shopping cart based on a distance distribution of the plurality of historical universal shopping carts containing the first set of items pertaining to the context. FIG. 4, with reference to FIGS. 1 through 3, depicts a context specific expected distribution for the user shopping cart based on a distance distribution of the plurality of historical universal shopping carts containing the first set of items pertaining to the context, in accordance with an embodiment of the present disclosure. The step 212 is better understood by way of following description:

A context specific expected behavior of the user shopping cart is determined in the real time based on a distance distribution of historical universal shopping carts containing the first set of items and to enable (i) measuring the position of the user shopping cart in real time in comparison to context specific expected behavior of the user shopping cart, and (ii) comparison of real time position of the user with expected behavior at that time and without user identity and without user historical shopping carts.

Identification of behavioral item and noise item is repeated when an item is added in the shopping cart by considering that the historical shopping carts should have previous items. Historical universal shopping carts having only behavioral items by omitting noise items are filtered and is formed as a group and noted as standard group. Central point of the standard group is derived using multivariate distance by considering all the shopping carts within the standard group. Multi variate distance of a shopping cart with centroid is found and repeated for all the shopping carts of the standard group. The calculated multivariate distances are used to derive a distribution noted as standard behavior (e.g., refer FIG. 4) and mean and standard deviation of distribution are calculated as per standard procedures used for multivariate distribution. These steps enable the system 100 to derive the ideal shopping cart expected to happen for a context in real time without using historical shopping carts of the specific customer or in the absence of historical shopping carts of specific customer. In other words, the expected behavior of a shopper is derived through items picked by the user and use of historical universal shopper carts of general shoppers. Thus, the expected behavior could be derived for the shoppers/user whose identification is not available in the database At step 214 of the method of the present disclosure, the one or more hardware processors 104 are configured by the instructions to categorize in the real-time, in an earlier phase of a self-checkout development, the user shopping cart as a first type or a second type based on a position of the user shopping cart in comparison to dynamic cut off value of the context specific expected distribution for an approval of the user shopper cart.

The step of categorizing the user as the first type or the second type in earlier phase of product development based on the context specific behavior of the shopping cart associated with the user comprises performing a comparison of the context specific behavior of the shopping cart associated with the user with a context specific threshold which is decided by context specific distribution and its parameters and identifying the user shopping cart as the first type or the second type based on the comparison and measuring the correctness for a 'first type' and a 'second type' through various means and storing information such as context and format of correctly categorized shopping carts and associated real time factors.

Figures 6A, 6B, 6C:
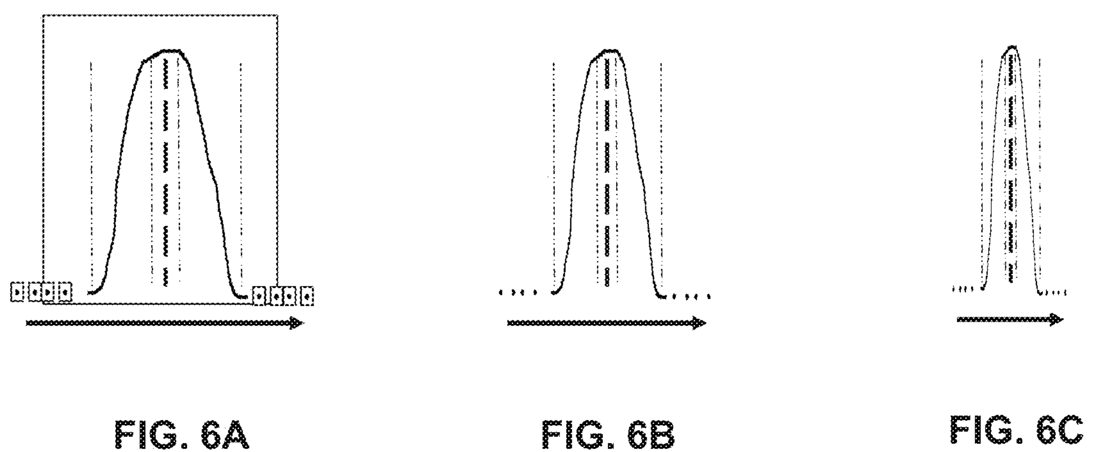
FIGS. 6A through 6C depict a measure of level of deviation and severity of the deviation both behavioral and noise items in user's shopping cart viz-a-viz standard behaviour, in accordance with an embodiment of the present disclosure.

The current shopping cart with all the items such as both behavioral and noise items is compared with standard behavior to identify its position in relation to the standard behavior and to measure the level of deviation and severity of the deviation in earlier phase of the self-checkout development. The current/test shopping cart is the shopping cart that comes for scanning at checkout counter, or the shopping cart filled through 'scanning while shopping' and the like. The magnitude of deviation of a shopping cart in comparison to the centroid is used as the level of suspect. If the level of deviation is more it indicates higher suspect and vice versa. Also, more importantly the severity of the deviation is identified by considering within variation of the standard group (WVS). Here, within variation is derived in similar manner as explained in the previous section. In an instance, if the WVS is more (FIG. 6A), then slight deviation may not be a serious deviation. In contrast, if WVS is very less (FIG. 6C), then slight deviation may become a serious deviation. FIGS. 6A through 6C, with reference to FIGS. 1 through 5, depicts a measure of level of deviation and severity of the deviation both behavioral and noise items in user's shopping cart viz-a-viz standard behaviour, in accordance with an embodiment of the present disclosure. The severity of the deviation and cut off value for the suspect for fraud or not is decided by system based on the real time performance of the approach suggested. Initially the range for approval of a shopping cart is decided temporarily as mean±3 standard deviation (FIG. 4). Here, mean and standard deviation are the measures derived from the universal shopping carts having only behavioral items. Here, standard deviation is an indicative value for WHS, and which varies depending on many factors such as real time factors and shopping cart format of the product such as class, sub class, etc. When a current/test shopping cart comes for scanning at checkout counter, standard distribution is derived in real time as described earlier, the test shopping cart is decided as suspect for fraud or not based on the position of the shopping cart in comparison to the range in the standard distribution. If the test shopping cart lies within the range of standard distribution and it is preempted as 'first type', then it is allowed for checkout. If the test shopping cart crosses the range of the standard distribution, then test shopping cart is preempted as fraud and noted as 'second type'.

At step 216 of the method of the present disclosure, the one or more hardware processors 104 are configured by the instructions to monitor correctly categorized via the one or more hardware processors, the first type or the second type of one or more shopping carts through one or more monitoring devices and storing information comprising at least one context and a format of a plurality of correctly categorized shopping carts.

At step 218 of the method of the present disclosure, the one or more hardware processors 104 are configured by the instructions to continually improve an accuracy of the categorization via the one or more hardware processors, in the earlier phase of the self-checkout development, through (i) a self-learning mechanism by using the at least one context, the format of universal shopping carts, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts and (c) real time specific ideal formats of associated real time factors in an iterative manner.

At step 220 of the method of the present disclosure, the one or more hardware processors 104 are configured by the instructions to develop and train a machine learning model in an advanced phase of the self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts. The step 220 is better understood by way of following description:

Machine learning model is developed and trained in advanced phase of product development, and 'shopping cart for approval' is predicted based on machine learning model trained with correctly categorized shopping carts and associated real time factors to enable categorization in short span of time and usage of lesser memory resources and without extracting and using historical universal shopping carts.

The historical shopping carts which were identified correctly by the system 100 are filtered and termed as 'useful shopping carts' and used for modeling to enable maturation towards right path in long run as described here. Historical format of real time factors and format of items for each useful shopping cart and their class such as (a) first type or shopper cart for approval (b) second type or shopper cart for supervision or suspect of fraud are collected. Historical useful shopping carts are classified into many groups in such a way that each group has useful shopping carts with same format of real time factors and same format of items and each group is termed as 'useful subset'. Each useful set acts as a separate training set and is termed as 'training useful set'. Each training set has format of real time factors and format of items for each useful shopping cart and their class such as (a) first type, or (b) second type. For a training useful set, format of real time factors and format of items are used as independent variable and class such as (a) suspect of fraud, or (b) no suspect for fraud is used as dependent variable. Machine learning model for binary classification such as neural network, random forest and the like for logistic regression is used by the system 100 for model training with individual 'useful subset'. It is to be noted that binary classification model is trained to predict probability for approval of a shopping cart, and it enables to decide a shopping cart having a predicted probability above a dynamic cut off value as approved. As each 'useful subset has unique format of real time factors and format of shopping carts, separate training is carried out for each useful subset.

When a new shopping cart is nearing the counter at the retail stores, or when a shopping cart is filled through 'scanning while shopping' and the like, the entities such as the shopping cart, the timestamp and store ID are converted into suitable formats to ensure that the converted formats are mapped with the format owned by any one of the useful subset. The converted format that suits for a 'useful subset' is used to predict the probability for the shopping cart being first type and error for prediction. Thus, the process is repeated for each useful subset and the best one with lowest error is selected. Initially, if the calculated probability for a shopping cart is greater than cut off value of 0.5, then the system 100 classifies the shopping cart as allowable. The cut off value is readjusted by moving from 0.5 to 0.01 depending on the system's performance in real time. In retail it is expected that genuine customer/user should not be assigned as second type or 'suspect of fraud'. When the cut of value is fixed as 0.5, all the shopping carts having predicted probability greater than 0.5, are allowed to check out. If few genuine customers are coming in the list of second type i.e., shopping carts with predicted probability lesser than 0.5 in which genuine customers are identified through various monitoring devices and the like, then the cut of value is reduced by the system 100 and continuation of adjustment of cut off value happens until no genuine customer is present in the list of shopping carts with predicted probability lesser than the cut of value.

At step 222 of the method of the present disclosure, the one or more hardware processors 104 are configured by the instructions to approve, the user shopping cart for a check out predicted as the first type by the trained machine learning model based on a comparison of the predicted probability of the user shopping cart with dynamic cut off value of the predicted probability by the trained machine learning model. At step 224 of the method of the present disclosure, the one or more hardware processors 104 are configured by the instructions to monitor outcome, for the first type and the second type through the one or more monitoring devices and store information pertaining to the at least one context, the format of the plurality of correctly approved user shopping carts and associated predicted probabilities. At step 226 of the method of the present disclosure, the one or more hardware processors 104 are configured by the instructions to continually improve the accuracy of the approval of the user shopping carts via the one or more hardware processors, in the advanced phase of the self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts, and (c) real time specific ideal formats of associated real time factors in an iterative manner. The steps 222 through 226 are better understood by way of following description:

The success of self-checkout implementation depends on its efficiency of identifying the user shopping cart for approval for self-checkout with x (e.g., x=100) percent accuracy. The accuracy depends on the dynamic entities namely (a) the cut of value assigned for the context specific expected behavioral distribution, (b) the cut of value of the probability for the approval of shopping cart, and (c) the format of shopping carts used for finding similarity among the group of shopping carts. These dynamic entities undergo continuous upgradation until they result 100 percent accuracy in allowing shopping cart for approval for self-checkout. The upgradation is done from the aggregated measures of the correctly categorized historical shopping carts and their associated information and it is done by adding a variability component for each aggregated measure to enable to move towards the ideal measure for each entity. The aggregated measure may be a single measure such as a probability value or a range such as mean plus or minus standard deviation or a weight associated to a format. The aggregated measure is added with a variability component with the magnitude of proportion of the aggregated measure. The proportion may vary from 0 to 100 percent of the aggregated measure. The variability component enables to move towards ideal value for each dynamic entity.

In the earlier phase of the self-checkout development, (a) the ideal cut of value of the context specific distribution for the approval of user shopper cart, (b) real time specific ideal formats of the plurality of historical universal shopping carts, and (c) real time specific ideal formats of associated real time factors are determined by maximizing a matching score between the categorized first type and actual first type in an iterative manner. In an instance, while finding the ideal cut of value for the shopper/user's expected context specific distribution, initially at the start of the self-checkout development, the cut of value is assigned as mean±3 standard deviation (SD) with varying component of 'x' percent say for example 50 percent of existing value. Thus, the cut of value may take any random ranges between (a) mean plus or minus 1.5 SD and (b) mean±4.5 SD. Here, the 50 percent of 3 resulting 1.5 leads to new boundaries. Based on the random ranges, each user shopping cart is categorized during their checkout and monitored. After few defined periods, correctly categorized historical shopping carts are used to derive updated aggregated measure namely updated range. In an instance, if mean±1.9 SD has the maximum occurrence, then it becomes as the new updated range, and it is added with varying component for next upgradations as described earlier. Thus, this process continues until stabilization happens in the range by maximizing matching score between 'first type' and actual 'no defaulter' in an iterative way (e.g., refer FIG. 2).

In the advanced phase of the self-checkout development, (a) the ideal cut of value of the predicted probability for the approval of user shopper cart, (b) real time specific ideal formats of historical universal shopping carts, and (c) real time specific ideal formats of associated real time factors are determined by maximizing a matching score between predicted shopping carts for approval of the trained machine learning model and actual 'first type' in an iterative manner. From the correctly categorized shopping carts and their associated information, aggregated measure namely 'maximum probability' is identified, and varying component is added to decide the cut of value for next phase and continued until the upgraded probability value stabilizes. Varying component enables to move towards ideal value of cut off value with improved accuracy though continuous learning by the system by maximizing matching score between predicted 'shopping carts for approval' of the machine learning model and actual 'no defaulter' in an iterative way (e.g., refer FIG. 2).

All the shopping carts which are categorized correctly, are identified and aggregated measure namely 'average weights' for the two types are calculated and added with varying component of 50 percent to decide the upgraded weights for next phase and continued until the upgraded weight values stabilize. Varying component enables to move towards ideal value of weights with improved accuracy though continuous learning by the system by maximizing matching score between predicted 'shopping carts for approval' of the machine learning model and actual 'no defaulter' and also maximizing matching score between 'first type' and actual 'no defaulter' in an iterative way by enabling to get optimal similarity of historical universal shopping carts containing the one or more items being added in the user shopping cart.

Once 100 percent accuracy in identifying the user shopping cart for approval for self-checkout is obtained in the advanced phase of the self-checkout development, complete deployment of self-checkout is carried out and frequency of monitoring activity is reduced, and occasional partial monitoring is carried out to validate the performance of the system randomly. During occasional partial monitoring, if required, suitable adjustment of all or few dynamic entities is made by the system in batch mode to maintain 100 percent accuracy. The dynamic entities namely (a) the cut of value assigned for the context specific expected behavioral distribution, (b) the cut of value of the probability for the approval of shopping cart, and (c) the format of shopping carts used for finding similarity among the group of shopping carts undergo fine tuning by the system to maintain 100 percent accuracy in allowing shopping cart for approval for self-checkout.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Retailers need a practical application which will preempt the customers with fraudulent activity during self-checkout process and which will enable to streamline the monitoring activity during self-checkout process. The embodiments of present disclosure herein address unresolved problem of need of customer identity and need of information about customer historical shopping carts for approval of shopping cart for self-checkout. The embodiment thus provides systems and methods to approve a shopping cart during self-checkout based on the items picked by the user in real time by deriving context specific expected behavior of the customer and using the same for approval of a shopping cart for self-checkout. Moreover, the embodiments herein further provide systems and methods to approve a shopping cart during self-checkout without using customer identity and his/her historical shopping carts.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

obtaining in real-time, via one or more hardware processors, information pertaining to a user shopping cart associated with a user for a context further comprising one or more real-time factors, wherein the user shopping cart comprises one or more items being added therein;

extracting in the real-time, via the one or more hardware processors, a plurality of historical universal shopping carts containing the one or more items being added in the user shopping cart and which is done in a similar context of the user shopping cart;

identifying, a behavioral item and a noise item when a new item is added in the user shopping cart, wherein based on items being added, variations within a group of historical shopping carts increase or decrease, wherein when the within group variation is reduced then the new item is noted as the behavioral item and a level of reduction is noted as a signal carried by the new item in positive direction towards identifying intention of the user, wherein when the within group variation is increased then the new item is noted as the noise item and a level of increase is noted as a signal carried by the new item in negative direction, wherein behavioral items are noted as first set of items and noise items are noted as second set of items;

measuring in the real-time, via the one or more hardware processors, similarity of the plurality of historical universal shopping carts based on one or more formats of the plurality of historical universal shopping carts;

determining in the real-time via the one or more hardware processors, during addition of the one or more items in the shopping cart, an improvement in the similarity among the extracted historical universal shopping carts containing the one or more items being added in the user shopping cart for the context;

identifying in the real-time, via the one or more hardware processors, a first set of items amongst the one or more items being added in the user shopping cart based on the improvement in the similarity;

determining in the real-time, via the one or more hardware processors, a context specific expected distribution for the user shopping cart based on a distance distribution of the plurality of historical universal shopping carts containing the first set of items pertaining to the context;

categorizing in the real-time via the one or more hardware processors, in an earlier phase of a self-checkout development, the user shopping cart as a first type or a second type based on a position of the user shopping cart in comparison to dynamic cut off value of the context specific expected distribution for an approval of the user shopper cart;

monitoring correctly categorized via the one or more hardware processors, the first type or the second type of one or more shopping carts through one or more monitoring devices and storing information further comprising at least one context and a format of a plurality of correctly categorized shopping carts;

continually improving an accuracy of the categorization via the one or more hardware processors, in the earlier phase of the self-checkout development, through (i) a self-learning mechanism by using the at least one context, the format, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts, and (c) real time specific ideal formats of associated real time factors in an iterative manner, wherein the plurality of historical useful shopping carts are classified into groups where each group has useful shopping carts with same format of real time factors and same format of items as a useful subset, wherein the useful subset acts as a separate training set and is termed as a training useful set, wherein each training set has format of real time factors and format of items for each useful shopping cart and their class such as (a) first type, or (b) second type, wherein the training useful set, format of real time factors and format of items are used as independent variable and class as (a) suspect of fraud, or (b) no suspect for fraud is used as dependent variable;

developing and training, via the one or more hardware processors, a machine learning model in an advanced phase of the self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts;

approving in the real-time via the one or more hardware processors, the user shopping cart for a check out predicted as the first type by the trained machine learning model based on a comparison of the predicted probability of the user shopping cart with dynamic cut off value of the predicted probability by the trained machine learning model;

monitoring outcome via the one or more hardware processors, for the first type and the second type through the one or more monitoring devices and storing information pertaining to the at least one context, the format of the plurality of correctly approved user shopping carts and associated predicted probabilities;

continually improving the accuracy of the approval of the user shopping carts via the one or more hardware processors, in the advanced phase of the self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts and (c) real time specific ideal formats of associated real time factors in an iterative manner, wherein the shopping cart is approved based on the items picked by the user in real time by deriving context specific expected behavior of the customer and using the same for approval of a shopping cart for self-checkout; and performing deployment of the self-checkout in response to obtaining improved accuracy of the approval of the user shopping carts in the advanced phase of the self-checkout development and reducing the frequency of monitoring activity to periodic partial monitoring to validate performance of system randomly.

2. The processor implemented method of claim 1, wherein in the earlier phase of the self-checkout development, (a) the ideal cut of value of the context specific distribution for the approval of user shopper cart, (b) real time specific ideal formats of the plurality of historical universal shopping carts, and (c) real time specific ideal formats of associated real time factors are determined by maximizing a matching score between the categorized first type and actual first type in an iterative manner, wherein the plurality of historical universal shopping carts having behavioral items by omitting noise items are filtered and is formed as a standard group, wherein central point of the standard group is derived using multivariate distance by considering all the shopping carts within the standard group, wherein multi variate distance of a shopping cart with centroid is found and repeated for all the shopping carts of the standard group, wherein the calculated multivariate distance is used to derive a distribution noted as standard behavior and mean and standard deviation of distribution are calculated as per standard procedures used for multivariate distribution, wherein an ideal shopping cart is derived for a context in real time.

3. The processor implemented method of claim 1, wherein in the advanced phase of the self-checkout development, (a) the ideal cut of value of the predicted probability for the approval of user shopper cart, (b) real time specific ideal formats of historical universal shopping carts, and (c) real time specific ideal formats of associated real time factors are determined by maximizing a matching score between predicted shopping cart for approval of the trained machine learning model and actual first type in an iterative manner, wherein entities including a shopping cart, a timestamp and a store ID are converted into suitable formats to ensure that the converted formats are mapped with the format owned by the useful subset, wherein the converted format is used to predict the probability for the shopping cart, wherein the process is repeated for each useful subset and the one with lowest error is selected, wherein the dynamic entities (a) the cut off value assigned for the context specific expected behavioral distribution, (b) the cut off value of the probability for the approval of shopping cart, and (c) the format of shopping carts used for finding similarity among the group of shopping carts undergo fine tuning to maintain accuracy in allowing shopping cart for approval for self-checkout, wherein the machine learning model enables categorization of user shopping carts in real time without extracting the plurality of historical universal shopping carts, wherein the cut off value is readjusted depending on a real time system performance.

4. The processor implemented method of claim 1, wherein the context comprises one or more real-time factors which include at least one of a time, a location, and weather.

5. The processor implemented method of claim 1, wherein the one or more formats of the plurality of historical universal shopping carts comprises at least one of (i) one or more formats of items present, (ii) one or more formats of value spread, and (iii) one or more formats of order of items picked, and wherein the one or more formats are based on an associated importance level.

6. The processor implemented method of claim 1, wherein the step of determining the context specific expected distribution of the user shopping cart enables to measure the position of the user shopping cart in real time in comparison to the context specific expected distribution of the user shopping cart without a user identity and without historical shopping carts of the user, wherein the position is determined by comparing a current shopping cart comprising both the behavioral items and the noise items with a standard behavior, so as to measure a level of deviation of the current shopping cart from the standard behavior and to determine a severity of the deviation.

7. The processor implemented method of claim 1, wherein the step of identifying the first set of items amongst the one or more items further comprises identifying a second set of items amongst the one or more items.

8. The processor implemented method of claim 1, wherein the first set of items and the second set of items are different from each other.

9. A system, comprising:

a memory storing instructions;

one or more communication interfaces; and one or more hardware processors coupled to the memory via the one or more communication interfaces, wherein the one or more hardware processors are configured by the instructions to:

obtain in real-time, information pertaining to a user shopping cart associated with a user for a context further comprising one or more real-time factors, wherein the user shopping cart comprises one or more items being added therein;

extract in the real-time, a plurality of historical universal shopping carts containing the one or more items being added in the user shopping cart and which is done in a similar context of the user shopping cart;

identify, a behavioral item and a noise item when a new item is added in the user shopping cart, wherein based on items being added, variations within a group of historical shopping carts increase or decrease, wherein when the within group variation is reduced then the new item is noted as the behavioral item and a level of reduction is noted as a signal carried by the new item in positive direction towards identifying intention of the user, wherein when the within group variation is increased then the new item is noted as the noise item and a level of increase is noted as a signal carried by the new item in negative direction, wherein behavioral items are noted as first set of items and noise items are noted as second set of items;

measure in the real-time, similarity of the plurality of historical universal shopping carts based on one or more formats of the plurality of historical universal shopping carts;

determine in the real-time, during addition of the one or more items in the shopping cart, an improvement in similarity among the extracted historical universal shopping carts containing the one or more items being added in the user shopping cart for the context;

identify in the real-time, a first set of items amongst the one or more items being added in the user shopping cart based on the improvement in similarity;

determine in the real-time, a context specific expected distribution for the user shopping cart based on a distance distribution of the plurality of historical universal shopping carts containing the first set of items pertaining to the context;

categorize in the real-time, in an earlier phase of a self-checkout development, the user shopping cart as a first type or a second type based on a position of the user shopping cart in comparison to dynamic cut off value of the context specific expected distribution for an approval of the user shopper cart;

monitor correctly categorized, the first type or the second type of one or more shopping carts through one or more monitoring devices and storing information further comprising at least one context and a format of a plurality of correctly categorized shopping carts;

continually improve an accuracy of the categorization, in the earlier phase of the self-checkout development, through (i) a self-learning mechanism by using the at least one context, the format, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts, and (c) real time specific ideal formats of associated real time factors in an iterative manner, wherein the plurality of historical useful shopping carts are classified into groups where each group has useful shopping carts with same format of real time factors and same format of items as a useful subset, wherein the useful subset acts as a separate training set and is termed as a training useful set, wherein each training set has format of real time factors and format of items for each useful shopping cart and their class such as (a) first type, or (b) second type, wherein the training useful set, format of real time factors and format of items are used as independent variable and class as (a) suspect of fraud, or (b) no suspect for fraud is used as dependent variable;

develop and train, a machine learning model in an advanced phase of the self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts;

approve in the real-time, the user shopping cart for a check out predicted as the first type by the trained machine learning model based on a comparison of the predicted probability of the user shopping cart with dynamic cut off value of the predicted probability by the trained machine learning model;

monitoring outcome, for the first type and the second type through the one or more monitoring devices and storing information pertaining to the at least one context, the format of the plurality of correctly approved user shopping carts and associated predicted probabilities;

continually improve the accuracy of the approval of the user shopping carts, in the advanced phase of the self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts and (c) real time specific ideal formats of associated real time factors in an iterative manner, wherein the shopping cart is approved based on the items picked by the user in real time by deriving context specific expected behavior of the customer and using the same for approval of a shopping cart for self-checkout; and perform deployment of the self-checkout in response to obtaining improved accuracy of the approval of the user shopping carts in the advanced phase of the self-checkout development and reducing the frequency of monitoring activity to periodic partial monitoring to validate performance of system randomly.

10. The system of claim 9, wherein in the earlier phase of the self-checkout development, (a) the ideal cut of value of the context specific distribution for the approval of user shopper cart, (b) real time specific ideal formats of the plurality of historical universal shopping carts, and (c) real time specific ideal formats of associated real time factors are determined by maximizing a matching score between the categorized first type and actual first type in an iterative manner, wherein the plurality of historical universal shopping carts having behavioral items by omitting noise items are filtered and is formed as a standard group, wherein central point of the standard group is derived using multivariate distance by considering all the shopping carts within the standard group, wherein multi variate distance of a shopping cart with centroid is found and repeated for all the shopping carts of the standard group, wherein the calculated multivariate distance is used to derive a distribution noted as standard behavior and mean and standard deviation of distribution are calculated as per standard procedures used for multivariate distribution, wherein an ideal shopping cart is derived for a context in real time.

11. The system of claim 9, wherein in the advanced phase of the self-checkout development, (a) the ideal cut of value of the predicted probability for the approval of user shopper cart, (b) real time specific ideal formats of historical universal shopping carts, and (c) real time specific ideal formats of associated real time factors are determined by maximizing a matching score between predicted shopping cart for approval of the trained machine learning model and actual first type in an iterative manner, wherein entities including a shopping cart, a timestamp and a store ID are converted into suitable formats to ensure that the converted formats are mapped with the format owned by the useful subset, wherein the converted format is used to predict the probability for the shopping cart, wherein the process is repeated for each useful subset and the one with lowest error is selected, wherein the dynamic entities (a) the cut off value assigned for the context specific expected behavioral distribution, (b) the cut off value of the probability for the approval of shopping cart, and (c) the format of shopping carts used for finding similarity among the group of shopping carts undergo fine tuning to maintain accuracy in allowing shopping cart for approval for self-checkout, wherein the machine learning model enables categorization of user shopping carts in real time without extracting the plurality of historical universal shopping carts, wherein the cut off value is readjusted depending on a real time system performance.

12. The system of claim 9, wherein the context comprises one or more real-time factors which include at least one of a time, a location, and weather.

13. The system of claim 9, wherein the one or more formats of the plurality of historical universal shopping carts comprises at least one of (i) one or more formats of items present, (ii) one or more formats of value spread, and (iii) one or more formats of order of items picked, and wherein the one or more formats are based on an associated importance level.

14. The system of claim 9, wherein the step of determining the context specific expected distribution of the user shopping cart enables to measure the position of the user shopping cart in real time in comparison to the context specific expected distribution of the user shopping cart without a user identity and without historical shopping carts of the user, wherein the position is determined by comparing a current shopping cart comprising both the behavioral items and the noise items with a standard behavior, so as to measure a level of deviation of the current shopping cart from the standard behavior and to determine a severity of the deviation.

15. The system of claim 9, wherein the step of identifying the first set of items amongst the one or more items further comprises identifying a second set of items amongst the one or more items.

16. The system of claim 9, wherein the first set of items and the second set of items are different from each other.

17. One or more non-transitory machine-readable information storage mediums comprising one or more instructions which when executed by one or more hardware processors cause:

obtaining in real-time, information pertaining to a user shopping cart associated with a user for a context further comprising one or more real-time factors, wherein the user shopping cart comprises one or more items being added therein;

extracting in the real-time, a plurality of historical universal shopping carts containing the one or more items being added in the user shopping cart and which is done in a similar context of the user shopping cart;

identifying, a behavioral item and a noise item when a new item is added in the user shopping cart, wherein based on items being added, variations within a group of historical shopping carts increase or decrease, wherein when the within group variation is reduced then the new item is noted as the behavioral item and a level of reduction is noted as a signal carried by the new item in positive direction towards identifying intention of the user, wherein when the within group variation is increased then the new item is noted as the noise item and a level of increase is noted as a signal carried by the new item in negative direction, wherein behavioral items are noted as first set of items and noise items are noted as second set of items;

measuring in the real-time, similarity of the plurality of historical universal shopping carts based on one or more formats of the plurality of historical universal shopping carts;

determining in the real-time, during addition of the one or more items in the shopping cart, an improvement in the similarity among the extracted historical universal shopping carts containing the one or more items being added in the user shopping cart for the context;

identifying in the real-time, a first set of items amongst the one or more items being added in the user shopping cart based on the improvement in the similarity;

determining in the real-time, a context specific expected distribution for the user shopping cart based on a distance distribution of the plurality of historical universal shopping carts containing the first set of items pertaining to the context;

categorizing in the real-time, in an earlier phase of a self-checkout development, the user shopping cart as a first type or a second type based on a position of the user shopping cart in comparison to dynamic cut off value of the context specific expected distribution for an approval of the user shopper cart;

monitoring correctly categorized the first type or the second type of one or more shopping carts through one or more monitoring devices and storing information further comprising at least one context and a format of a plurality of correctly categorized shopping carts;

continually improving an accuracy of the categorization, in the earlier phase of the self-checkout development, through (i) a self-learning mechanism by using the at least one context, the format, and the dynamic cut off value of the context specific distribution of the plurality of correctly categorized shopping carts, and (ii) by finding (a) an ideal cut off value of the context specific distribution, (b) real time specific ideal formats of the plurality of historical universal shopping carts, and (c) real time specific ideal formats of associated real time factors in an iterative manner, wherein the plurality of historical useful shopping carts are classified into groups where each group has useful shopping carts with same format of real time factors and same format of items as a useful subset, wherein the useful subset acts as a separate training set and is termed as a training useful set, wherein each training set has format of real time factors and format of items for each useful shopping cart and their class such as (a) first type, or (b) second type, wherein the training useful set, format of real time factors and format of items are used as independent variable and class as (a) suspect of fraud, or (b) no suspect for fraud is used as dependent variable;

developing and training a machine learning model in an advanced phase of the self-checkout development, and predicting a user shopping cart for approval based on the trained machine learning model trained using the plurality of correctly categorized user shopping carts and associated context and format of the plurality of correctly categorized user shopping carts to enable categorization in real-time thereof and without extracting the plurality of historical universal shopping carts;

approving in the real-time, the user shopping cart for a check out predicted as the first type by the trained machine learning model based on a comparison of the predicted probability of the user shopping cart with dynamic cut off value of the predicted probability by the trained machine learning model;

monitoring outcome, for the first type and the second type through the one or more monitoring devices and storing information pertaining to the at least one context, the format of the plurality of correctly approved user shopping carts and associated predicted probabilities;

continually improving the accuracy of the approval of the user shopping carts, in the advanced phase of the self-checkout development through the self-learning mechanism by using the at least one context, the format and the dynamic cut off value of the predicted probability of the plurality of correctly categorized shopping carts and by finding (a) the ideal cut off value of the predicted probability for the approval of the one or more user shopper cart, (b) real time specific ideal formats of the plurality of historical universal shopping carts and (c) real time specific ideal formats of associated real time factors in an iterative manner, wherein the shopping cart is approved based on the items picked by the user in real time by deriving context specific expected behavior of the customer and using the same for approval of a shopping cart for self-checkout; and performing deployment of the self-checkout in response to obtaining improved accuracy of the approval of the user shopping carts in the advanced phase of the self-checkout development and reducing the frequency of monitoring activity to periodic partial monitoring to validate performance of system randomly.

18. The one or more non-transitory machine-readable information storage mediums of claim 17, wherein in the earlier phase of the self-checkout development, (a) the ideal cut of value of the context specific distribution for the approval of user shopper cart, (b) real time specific ideal formats of the plurality of historical universal shopping carts, and (c) real time specific ideal formats of associated real time factors are determined by maximizing a matching score between the categorized first type and actual first type in an iterative manner, wherein the plurality of historical universal shopping carts having behavioral items by omitting noise items are filtered and is formed as a standard group, wherein central point of the standard group is derived using multivariate distance by considering all the shopping carts within the standard group, wherein multi variate distance of a shopping cart with centroid is found and repeated for all the shopping carts of the standard group, wherein the calculated multivariate distance is used to derive a distribution noted as standard behavior and mean and standard deviation of distribution are calculated as per standard procedures used for multivariate distribution, wherein an ideal shopping cart is derived for a context in real time.

19. The one or more non-transitory machine-readable information storage mediums of claim 17, wherein in the advanced phase of the self-checkout development, (a) the ideal cut of value of the predicted probability for the approval of user shopper cart, (b) real time specific ideal formats of historical universal shopping carts, and (c) real time specific ideal formats of associated real time factors are determined by maximizing a matching score between predicted shopping cart for approval of the trained machine learning model and actual first type in an iterative manner, wherein entities including a shopping cart, a timestamp and a store ID are converted into suitable formats to ensure that the converted formats are mapped with the format owned by the useful subset, wherein the converted format is used to predict the probability for the shopping cart, wherein the process is repeated for each useful subset and the one with lowest error is selected, wherein the dynamic entities (a) the cut off value assigned for the context specific expected behavioral distribution, (b) the cut off value of the probability for the approval of shopping cart, and (c) the format of shopping carts used for finding similarity among the group of shopping carts undergo fine tuning to maintain accuracy in allowing shopping cart for approval for self-checkout, wherein the machine learning model enables categorization of user shopping carts in real time without extracting the plurality of historical universal shopping carts, wherein the cut off value is readjusted depending on a real time system performance.

20. The one or more non-transitory machine-readable information storage mediums of claim 17, wherein the context comprises one or more real-time factors which include at least one of a time, a location, and weather, wherein the one or more formats of the plurality of historical universal shopping carts comprises at least one of (i) one or more formats of items present, (ii) one or more formats of value spread, and (iii) one or more formats of order of items picked, and wherein the one or more formats are based on an associated importance level, wherein the step of determining the context specific expected distribution of the user shopping cart enables to measure the position of the user shopping cart in real time in comparison to the context specific expected distribution of the user shopping cart without a user identity and without historical shopping carts of the user, wherein the step of identifying the first set of items amongst the one or more items further comprises identifying a second set of items amongst the one or more items, wherein the first set of items and the second set of items are different from each other.

* * * * *